United States Patent [19]

Johnson et al.

[11] Patent Number: 4,832,542
[45] Date of Patent: May 23, 1989

[54] CLUTCHING MEANS ADAPTED FOR TAPPING ATTACHMENT

[75] Inventors: Allan S. Johnson, Newport Beach, Calif.; Alf Eriksson, Nacka, Sweden

[73] Assignee: Tapmatic Corporation, Irvine, Calif.

[21] Appl. No.: 129,239

[22] Filed: Dec. 7, 1987

Related U.S. Application Data

[63] Continuation-in-part of Ser. No. 35,805, Apr. 8, 1987, abandoned.

[51] Int. Cl.4 .............................................. F16D 11/00
[52] U.S. Cl. .................................. 408/139; 10/136 R; 192/21; 192/51; 408/142
[58] Field of Search .................... 408/139, 141, 142; 10/89 F, 136 R, 141 H; 192/21, 48.7, 51

[56] References Cited

U.S. PATENT DOCUMENTS 3,946,844  3/1976  Johnson ............................. 192/21 X
3,999,642  12/1976 Johnson ............................. 408/139 X Primary Examiner—Gil Weidenfeld
Assistant Examiner—Steven C. Bishop
Attorney, Agent, or Firm—Evanns & Walsh

[57] ABSTRACT

Clutching device particularly adapted for use in tapping attachments. The clutch is of the type having axial aligned driving and driven elements. The invention is illustrated in a reversible tapping attachment. In a preferred form the driving element is in the form of a sleeve having axial splines. The driven element has axial grooves. A ball retainer with angularly spaced balls provides for drive between the drive element and the driven element, the balls being engageable with the axial splines and with the axial grooves in the driven element. The improvement resides in that the axial grooves are not of the same width as the diameter of the balls but are of a width greater than the diameter of the balls, the width being preferably twice the diameter of the balls. Improved operation is realized in clutching and declutching and in the transfer through a neutral zone from direct drive to reverse drive. In the preferred embodiment the tapping attachment is of the free-axial float type.

9 Claims, 1 Drawing Sheet

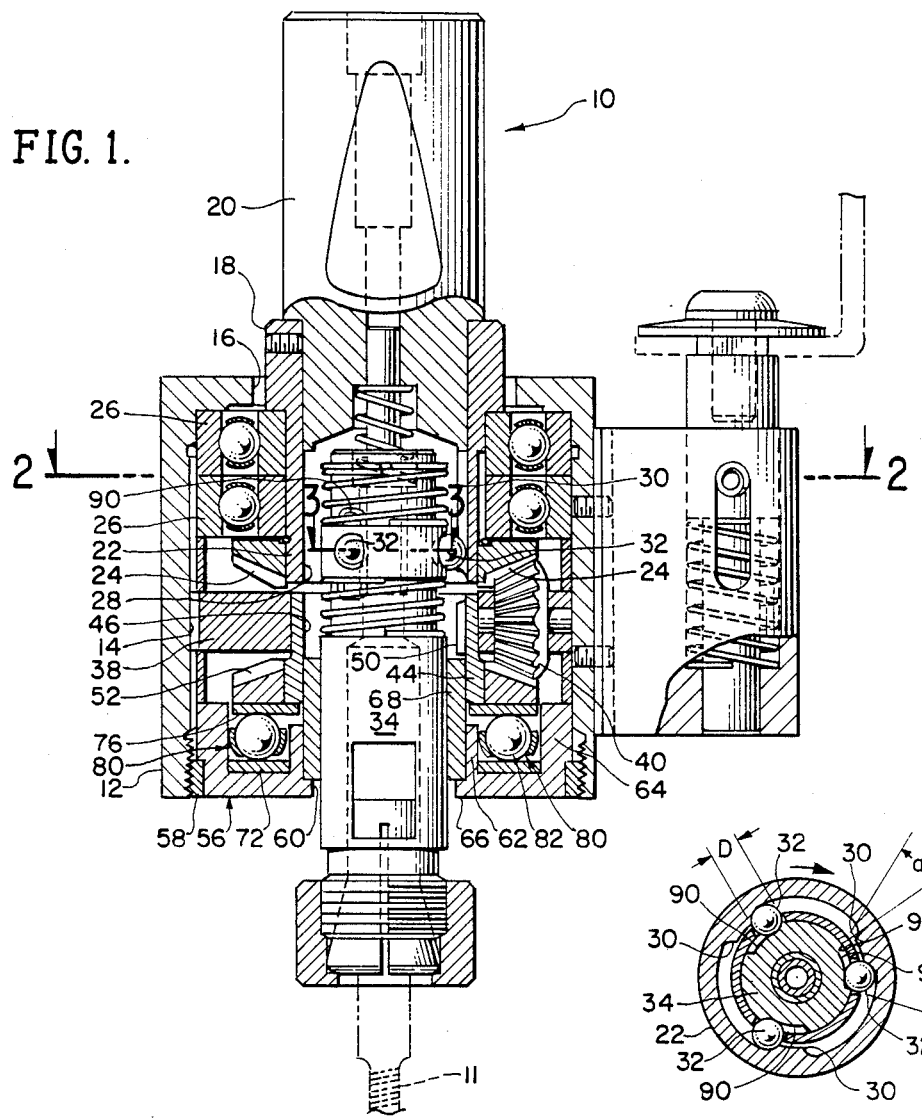
FIG. 1.
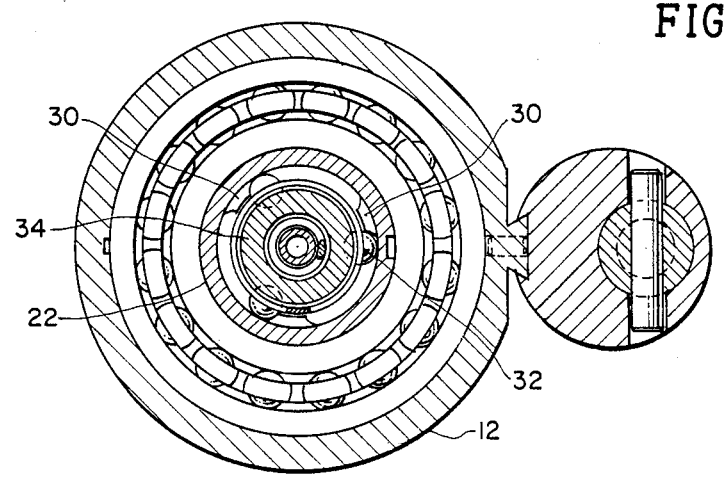
FIG. 3.
FIG. 2.

CLUTCHING MEANS ADAPTED FOR TAPPING ATTACHMENT

This application is a continuation-in-part of Ser. No. 07/035,805 filed 04/08/87 now abandoned.

FIELD OF THE INVENTION

The field of the invention is that of clutching means for providing drive between axially aligned members and is particularly adapted for tapping arrangements.

DESCRIPTION OF THE PRIOR ART

The background of art with respect to clutching devices adapted for use in tapping attachments such as the present invention is exemplified in prior patents particularly U.S. Pat. Nos. 3,946,844; 3,999,642; 4,014,421, and 4,029,429.

Reference is also made to the prior art patents identified in the description of prior art in these numbered patents. The numbered patents are incorporated herein by reference as though fully set forth herein. The prior art patents are patents dealing with ball drive clutching devices particularly adapted for use in tapping attachments.

SUMMARY OF THE INVENTION

As indicated, the preferred adaptation of the invention is in the drive of tapping attachments, which may be only direct drive attachments or reversing attachments of the type as disclosed in the prior patents identified in the foregoing. All of these structures are ball drive clutching means to provide driving torque between a drive member and a driven member which typically are axially aligned and telescoped together.

Typically in these attachments as shown in the prior art patents the ball drive embodies a circular ball carrier which carries the balls, and the drive transmitting torque between the aligned parts in through the balls both in direct drive, and in reverse drive where the attachment is a reverse drive tapping attachment.

In the clutching means of the attachments as referred to, normally the balls engage axial splines carried by a driving element and they engage in axial grooves in the driven element. Of course, reversal of parts in this arrangement would be possible.

It is of course very important that clutching and declutching action be accomplished and facilitated by the structures that cooperate with each other and the amount of wear that takes place be minimized. This is particularly true in connection with the declutching and clutching action involved in changing over between direct drive and reverse drive. Reverse drive in tapping attachments is of course known and shown in the prior patents referred to.

The herein invention improvement resides primarily in the construction of the axial grooves in one of the parts which in the preferred form is the driven part. The grooves are not of the same dimension as the drive balls themselves but rather the grooves are provided with a width which is greater than the diameter of the balls themselves. So the balls carried by the ball retainer cooperate with axial splines formed on the driving member and with the widened axial grooves in the driven member. In the preferred form of the invention the ball carrier is movably mounted on the driven member which is telescoped inside the driving member and is biased on both sides by resilient coil springs. It is to be seen therefore that the clutching and declutching action is facilitated minimizing friction and wear particularly in the transfer from direct drive to reverse drive wherein the driven member and the ball carrier move from a position in which the balls are in engagement with axial splines on the direct drive member to a position wherein they are in engagement with axial splines on the reverse drive member. It is of course preferable that the balls move into engagement with the side of a spline rather than in an angular position striking the end of a spline. In the herein invention, as pointed out, the ball carrier is moved between resilient members in the form of springs on opposite sides of the ball carrier. The ball carrier of course moves axially when the assembly moves out of clutching position into a declutching position and through neutral into a clutching position for a reverse drive.

When the ball carrier moves through neutral it tends to be held in the same angular position by reason of friction with the resilient springs so that the balls will come into contact in the most favorable position with the sides of the driving splines. However, the ball carrier and the balls have the capability of moving angularly which is provided for by the angular width of the grooves in the driven member. Thus the ball carrier and the balls are readily movable angularly to facilitate the balls coming into driving position against the axial splines. Thus the structure contributes significantly to elimination of friction and wear giving the assembly long useful life.

From the foregoing, the primary object of the invention will be readily apparent. That is, to provide improvement as described in a clutching device which facilitates the driving balls coming into clutching engagement and coming out of clutching engagement and particularly when the balls go though neutral and come into clutching engagement with the reverse drive splines.

It is to be seen that the invention is an improvement on the ball drive construction of the patents previously identified.

A further object is to provide an improved assembly as described having a ball retainer with balls, the balls being engageable with axial grooves in one of the elements wherein the axial grooves are wider; that is, they have an angular dimension which is greater than the diameter of the balls whereby and to allow angular movement of the ball retainer and the balls to facilitate friction free operation.

Further objects and additional advantages of the invention will become apparent from the following detailed description.

BRIEF DESCRIPTION OF THE DRAWINGS

FIG. 1 is a partially sectioned elevational view of a tapping attachment embodying the improved clutching assembly of the invention;

FIG. 2 is a cross-sectional view of FIG. 1 taken along the line 2—2; and

FIG. 3 is a cross-sectional view taken along the line 3—3 of FIG. 1.

DESCRIPTION OF A PREFERRED EMBODIMENT AND BEST MODE OF PRACTICE OF THE INVENTION

The invention as illustrated is embodied in a tapping attachment of a type similar to the attachments of the previously identified patents.

Referring to the drawings, there is shown a tapping attachment generally designated by the numeral 10 for use with a computer automated machining center or driving machine which drives the tap 11 through the attachment.

The tapping attachment 10 includes a housing 12 having a bore 14. Housing 12 has a top having in it a smaller bore 16. Received within the housing is a driving member in the form of a sleeve as designated at 18. The driving member 18 has a bore 28 and fitting in this bore is the end of the shank part 20 which is driven by the driving machine. The part 18 has an end part as identified at 22 and this part has in it the bore 28.

Secured at the bottom end of the driving member 18 is a beveled gear 24 which is secured to the end 22 of the driving member 18. Suitable bearings 26 are provided between the housing 12 and the driver 18 to facilitate rotation of the part 18 within the housing. Bearings 26 are like those of the previously identified patents comprising spaced circular members with ball races for the balls.

The surface of the bore 28 within the end part 22 of the member 18 is provided with angularly spaced inwardly projecting axial splines 30. The splines are engageable with drive balls 32 which are carried in a ball retainer 29 which is similar to the ball retainer of the attachments shown in the prior patents. Numeral 34 designates a spingle in the attachment which is of the free axial float type to which rotation is imparted from the driver 18 through the balls 32. As stated, the assembly is of the free floating type in which the spindle can freely axially progress towards the work piece due to progressive movement of the tap into the hole which is being tapped.

The upper part of the spindle 34 has a smaller diameter as shown and provided in its sides are axial grooves as designated at 90 (See FIG. 3). The axial grooves in the upper part of the spindle 34 will be referred to again presently, these grooves being a very significant aspect of the invention.

As will be understood as the spindle moves the ball carrier 29 and drive balls 32 can move axially so as to disengage from the spline 30 moving into a neutral position in between the direct drive position and the reverse drive position as will be referred to again presently.

The spindle 34 is biased downwardly by a spring 35 encircling shaft 36 at the upper end of the spindle 34, this shaft fitting in a bore 37 in the part 20. The spring 35 is around the shaft 36 within counter bore 27 in the end part of the shank 20.

The spindle 34 has an upper end part 39 which is of smaller diameter and on which is carried the ball retainer 29 and the resilient springs 43 and 45. The upper spring is held by a snap ring 46 at its upper end. The lower spring bears against a shoulder at the lower end of the upper end part of the spindle of smaller diameter 39.

The spindle 34 has bores in it as shown. It has an end bore 41 which received split collet 42 which fits into a tapered bore 43 in end part of the spindle 34. The end part of the shank is threaded as shown at 25 and threaded onto this end part is a nut 45 having bore 48 and a counter bore 47 providing a shoulder which fits against the end of the split collet 42. The tap 11 is held by the split collet 42.

Within the bore of 14 of the housing 12 is a planet gear carrier 38 which is like that of the reversing mechanisms in the attachments of prior patents which have been identified. Carried within the planet gear carrier 38 are angularly spaced planet gears 40 which are arranged so as to engage the beveled gear 24 of the driver 18. The planet gears provide for both direct and reverse drive as will be explained. The axis of the planet gear is 40 such as to project a line normal to the axis of the spindle 34. In operation rotation of the driver 18 causes rotation of the planet gears 40 thus imparting drive through the drive balls 32 to the axial splines 30 for direct drive. The planet gear carrier 38 is of course fixed relative to the housing 12 by any conventional means suitable for the purpose.

Also provided within the housing 12 for rotation or drive in a reverse direction is a reverse member 44 in the form of a sleeve having a bore 46 through which the spindle 34 extends. Like the driver 18, the inner surface of the bore 46 of the reversing member 44 is provided with angularly spaced axial splines 50 which operate to engage the driving balls 32 for purposes of reverse drive as will be described further. The reversing gear includes a beveled gear portion that is gear 52 which is engageable and with the planet gears 40 to cause reverse rotation of the spindle 34.

It will be understood that when the spindle 34 has sufficiently progressed into the work piece (not shown) the drive balls will be disengaged from the splines 30 terminating direct drive. At this time the driving machine will move the housing 12, that is, the attachment axially away from the work piece while simultaneously causing rotation of the driver 18. This movement of the housing 12 causes the driver balls 32 to come out of engagement with the splines 30 and to come into engagement with the splines 50 of the reversing gear which is rotating in a direction reverse to that of the splines 30. This happens because the free axial float spindle is held relative to the work piece by reason of its penetration of it. Engagement of the drive balls with the splines 50 of the reversing assembly that is the bevel gear 52 causes the spindle and the tap to back themselves out of the workpiece and away from it.

Within the bore of the housing 12 is closure plate 56 which is held therein by suitable means which as shown is the threaded ring 58. The closure plate 56 include inner and outer upwardly and projecting walls; that is, flanges 62 and 64 respectively. Numeral 66 designates a projecting lip on the plate 56 into which sleeve 68 is press fitted. Sleeve 68 is thus fixed relative to closure plate 56 which in turn is fixed relative to housing 12. Sleeve 68 receives spindle 34 and acts to journal the same for rotation within the housing. Received in the circular walls or flanges 62 and 64 is a ring 72. As similar ring 76 is provided just below the reversing gear or member 44 in a manner to trap ball bearing assembly 80 and ring 72. The bearing assembly includes a group of angularly spaced balls 82 in between the rings 72 and 76. It is to be understood by those skilled in the art that during axial movement of the tapping attachment away from the workpiece, so that withdrawal of the tap from the workpiece will be accomplished thrust load is generated. This thrust load is absorbed or taken by interaction of the upper ring 76 with balls 80 and lower ring 72 and closure plate 56.

The ring 72 is of approximately the size of the distance between the flanges 62 and 64 so as to provide a snug fit thus assuring that the ring 72 remains relatively stationary and radial migration thereof is minimal.

Ring 76 is in close running relationship to the surface of the flange 64 near the top thereof and extends inwardly over the top of flange 62. Ring 76 may rotate with the reverse drive mechanism.

The close position of ring 76 to wall 64 assures minimum radial migration thereof during rotation.

Reference is now made further to the axial grooves in the upper part 39 of the spindle 34 of smaller diameter. These angularly spaced grooves or channels are designated by the numeral 90. The drive balls 32 are received in these grooves as may be seen in FIG. 3. The channels 90 extend axially along the spindle and are of width or angular extent labeled "W" as shown in FIG. 3. The drive balls 32 are designated in FIG. 3 as being of diameter "D". The dimension "W" at the outer surface of spindle 34 is preferably twice that of dimension "D". This arrangement permits both axial and angular shifting of drive balls 32 in the grooves 90 in case of non-ideal alignment of balls 32 with either splines 30 or 50 and thus minimizes adverse wear and tear on the attachment 10 and minimizes friction as has been explained in the foregoing. As explained, the ball retainer 29 when moving from direct drive to reverse drive through the neutral zone, in this zone the ball retainer ring 29 tends to be held against angular movement by friction with the springs 43 and 45 to facilitate keeping the drive balls in the most favorable angular position before entering into and engaging the reverse drive spines 50. Smooth engagement is further facilitated by the fact that the ball retainer ring 29 and the balls 32 can move angularly to assure that the balls will properly engage with splines rather than balls striking the end of the splines instead of the sidewall of the splines. This operation is further facilitated of course by reason of the fact that the ball retainer ring 29 is resiliently mounted between he resilient springs 43 and 45.

The radially inward most surfaces of the channels 90 define a curved bottom surface that of course extends the axial length of the channels 90 parallel to the outer surface of the spindle itself. Each channel 90 terminates in a chamfered or beveled side 92 which defines a line that is askew to the radius of the spindle by angular dimension "a" as may be seen in FIG. 3. This construction minimizes wear and tear on the outer edges of the spindle 34.

As known in the prior art the body of a tapping attachment during operation must be held against rotation. Structure is provided for this purpose in the herein invention. Numeral 100 designates a cyclindrical body which is attached to the housing 12. Body 100 has an axial dovetail slot or mortise 102. Secured to a flat on the side of the body 12 is an axial or dovetailed tongue or tenon 104 which engages in the dovetail slot 102 holding the parts together.

The body 100 has a bore 108 and a smaller counter bore 110 at the bottom end. See FIG. 1 Numeral 112 designates a plunger which is received in the bore 108 and which has an end part 114 of smaller diameter that is received in the bore 110. The plunger 110 has a top cap 120 which is held on by member 122 which holds the end part of an angular bracket 124 which is attachable to the machine to hold the parts against angular movement.

The part 100 has transveres bore 130 and extending through this bore is a pin 132 which extends through the plunger 112. The end of the upper part of plunger 112 acts against a coil spring 134 that is, in the bore 108 and which surrounds the part of plunger 112 of smaller diameter that is the part 114. As may be seen the bracket 124 is attachable to the machine to hold the parts including the body 100 and the housing 12 against angular rotation. Plunger 112 is movable in bore 108 against spring 134 to accommodate to the machine.

From the foregoing, those skilled in the art will readily understand the nature and construction of the invention, its operation and the manner in which it achieves and realizes all of the objects as set forth in the foregoing. It is to be understood that the disclosure herein is representative of a preferred form of the invention and is to be interpreted in an illustrative rather than a limiting sense, the invention to be accorded the full scope of the claims appended hereto.

We claim:

1. In a coupling means for transmitting torque, in combination, means comprising a first element for imparting drive and a second element, which is a driven element, the coupling means being constructed to transmit torque between the first element and the second element, a ball retainer having angularly positioned drive balls, the said ball retainer and balls being interposed between the said elements, one of said elements having angularly spaced axial splines engageable with the balls, the other of said elements having angularly spaced vertical grooves engageable with the balls for transmitting drive, the said elements being relatively movable axially between engagement and non-engagement positions, the said vertical grooves having a width, which is greater than the diameter of the balls whereby engagement of the balls and disengagement with respect to the splines is facilitated.

2. A coupling device, as in claim 1, including resilient means positioned so that the said ball retainer can move axially in either direction against the resilient means, the said balls being moveable angularly, as well as axially in the said vertical grooves in one of said elements.

3. A coupling device, as in claim 1, including reverse drive means for providing reverse drive between the said first element, and a third element, operable for reverse drive and the said third element having angularly spaced vertical splines engageable with the said balls for reverse drive.

4. A coupling as in claim 1, wherein the said first element is in the form of a sleeve, and the second element being in the form of a shaft, the sleeve and shaft being coaxial.

5. A coupling, as in claim 1, wherein the said driven element is constructed to be adapted to carry a tap in a tapping attachment.

6. A coupling device as in claim 1, wherein the said vertical grooves have an angular width which is substantially twice the width of the drive balls.

7. A coupling device as in claim 2, wherein the bottom of said grooves lies along an arc having a center which is the center of the driven element.

8. A coupling as in claim 7 wherein the sides of each of the said grooves is chamfered or beveled minimizing wear and tear on the driven element.

9. A coupling as in claim 1 wherein said first element is a driving member in a tapping attachment and wherein the driven element is the spindle of a tapping attachment, the said spindle being mounted for free axial float, reverse drive means for providing for reverse drive between the said first element and the said spindle, said ball retainer and drive balls passing through a neutral zone between direct drive and reverse drive positions occasioned by a relative axial movement between the drive element and the spindle, the said retainer and drive balls having the capability of moving angularly to facilitate engagement of the drive balls with said axial splines.

* * * * *